Figure 1:
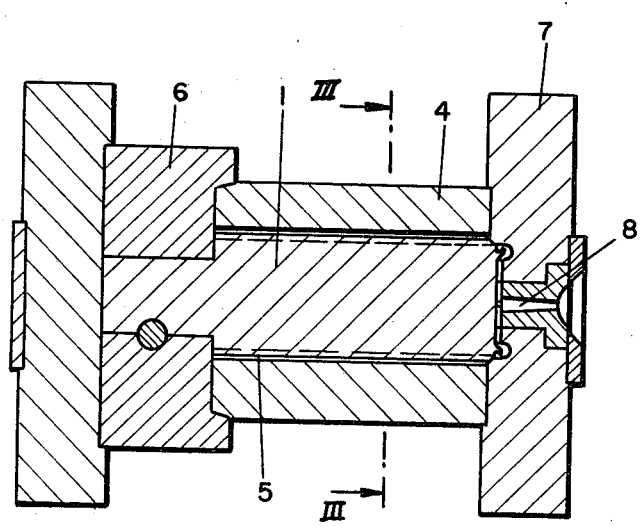

United States Patent [19]

Breher

[11] 4,443,396

[45] Apr. 17, 1984

[54] METHOD OF PRODUCING A LENGTH OF FLEXIBLE TUBING N THE FORM OF A TOOTHED BELT AND A MOLDING TOOL THEREFOR

[75] Inventor: Rudolf Breher, Porta Westfalica, Fed. Rep. of Germany

[73] Assignee: Breco Kunststoffverarbeitungs GmbH & Co. KG, Porta Westfalica, Fed. Rep. of Germany

[21] Appl. No.: 287,596

[22] Filed: Jul. 28, 1981

[30] Foreign Application Priority Data

Aug. 20, 1980 [DE] Fed. Rep. of Germany ....... 3031330

[51] Int. Cl.³ .......................... B29F 1/10; B29H 9/02
[52] U.S. Cl. ................................... 264/136; 264/257; 264/271.1; 264/275; 264/328.2; 264/328.9; 264/328.12; 425/123; 425/543; 425/577
[58] Field of Search .................. 264/257, 328.2, 275, 264/271.1, 251, 277, 328.9, 328.12, 136; 425/123, 577, 543

[56] References Cited

U.S. PATENT DOCUMENTS

| | | | |
|---|---|---|---|
| 1,363,912 | 12/1920 | Pauly | 264/277 X |
| 3,109,202 | 11/1963 | Beckadolph et al. | 264/275 X |
| 3,441,641 | 4/1969 | Roberts | 264/257 X |
| 3,482,004 | 12/1969 | Anderson | 264/277 X |
| 3,856,907 | 12/1974 | Cicognani | 264/257 X |

FOREIGN PATENT DOCUMENTS

| | | |
|---|---|---|
| 972176 | 9/1959 | Fed. Rep. of Germany . |
| 1964090 | 7/1970 | Fed. Rep. of Germany . |
| 2655584 | 6/1978 | Fed. Rep. of Germany . |
| 2249488 | 11/1978 | Fed. Rep. of Germany . |
| 2653741 | 10/1979 | Fed. Rep. of Germany . |
| 744907 | 2/1956 | United Kingdom ............... 264/257 |

*Primary Examiner*—Philip E. Anderson
*Attorney, Agent, or Firm*—Martin A. Farber

[57] ABSTRACT

A mould and method for the manufacture of a length of plastic tube within which a reinforcing wire coil is embedded, the toothed-belt-like inner side of the tube being covered by a fabric cover, the mould comprising a mould core having axial teeth, tooth notches therebetween and a mould sleeve spaced therearound. The mould core, over which the sleeve-shaped fabric cover is first of all placed, whereupon the wire coil is wound thereon, forms, with the mould sleeve, a mould cavity having the shape of a cylindrical ring, the plastic being introduced axially into the mould cavity from one end. At a face end the mould core has an non-toothed mould core portion which projects axially beyond the end of the teeth and has a holding surface, the diameter of which is reduced down to the diameter of the tooth notches. The fabric cover has an edge projecting axially beyond the ends of the teeth, constricted radially past the cross sections of the tooth notches and fastened in sealing manner to the holding surface of the mould core portion and the plastic is introduced axially into the mould cavity at the end of the latter at the mould core portion which contains the fastened edge of the fabric cover.

5 Claims, 5 Drawing Figures

METHOD OF PRODUCING A LENGTH OF FLEXIBLE TUBING N THE FORM OF A TOOTHED BELT AND A MOLDING TOOL THEREFOR

The invention relates to a moulding tool for producing a length of flexible tubing in the form of a toothed belt from an elastomer material which is able to flow with a reinforcing insert in the form of a wire extending in the peripheral direction of the flexible tubing and a fabric cover covering the toothed side of the flexible tubing, wherein the moulding tool consists of a cylindrical mould core with teeth and tooth notches extending axially on its periphery and a mould sleeve surrounding the mould core forming an annular cylindrical mould cavity and one end of the mould cavity is the entry point for the axial supply of the elastomer material into the mould cavity. The invention further relates to a method of producing such a length of flexible tubing in the form of a toothed belt wherein the fabric cover surrounding the mould core like a sleeve is first laid on the axially extending teeth of a cylindrical mould core and then the reinforcing insert is wound on and afterwards the mould core is inserted in a mould sleeve and the elastomer material is introduced axially into the annular cylindrical mould cavity formed.

The plastics material polyurethane for example is suitable for the production of toothed belts but has a high coefficient of friction. In order to improve the running characteristics of such a toothed belt, it is known to cover the toothed side of the belt with a fabric cover of a plastics material having a very low coefficient of friction such as polyamide (nylon) for example.

For extruding toothed belts in endless form with a reinforcing insert in the form of wire or thread, or lengths of flexible tubing in the form of toothed belts with such a reinforcing insert embedded, from which toothed belts with the required belt width are cut off, a moulding tool of the kind referred to at the beginning is known from the DE-PS No. 26 53 741, but is not yet suitable for the production of a length of flexible tubing with a fabric cover covering the toothed side of the flexible tubing. A fabric cover laid like a sleeve over the teeth of the mould core, like the reinforcing insert afterwards wound around the mould core on the fabric cover, would hollowly span the tooth notches between the mould-core teeth and even with flexible expansibility in the peripheral direction of the mould core would not lie in the tooth notches upon injection of the elastomer material, and instead the elastomer material would flow under the side of the fabric cover adjacent to the surface of the mould core at the ends of the tooth notches adjacent to the injection point, so that no length of flexible tubing with a fabric cover covering the toothed side of the flexible tubing would result. In the method known from the DE-PS No. 22 49 488 for the production of a length of flexible tubing with a reinforcing insert and fabric cover by casting on the displacement principle into a moulding tool consisting of mould core and mould sleeve, the fabric cover, which surrounds the mould core like a sleeve and is expansible in the peripheral direction of the mould core, is pressed tightly into the tooth notches by separate transverse members which are inserted in the tooth notches before the mould core is wound with the reinforcing insert, after which the filling in of the mould cavity and the tooth notches with the elastomer material is effected.

This method is complicated and expensive because the transverse members must be so inserted and held in the tooth notches of the mould core, for example by winding of the mould core with transverse members in the form of wire, that the transverse members cannot fall out of the tooth notches of the mould core before the reinforcing insert is wound about the mould core and can hold the transverse members pressed into the tooth notches. In addition, the transverse members necessary for pressing the fabric cover into the tooth notches of the mould core are necessarily an embedded integral component of the finished length of flexible tubing or of the toothed belt cut off this, which is undesirable particularly with small sizes of toothed belt with a fine tooth pitch.

The object of the invention is to provide a moulding tool of the kind referred to at the beginning and to find a method with such a moulding tool with which a reinforced length of flexible tubing in the form of a toothed belt with a fabric cover covering the toothed side of the flexible tubing can be produced in a simple manner and at the same time the effect is reliably achieved that the fabric cover automatically lies snugly in the tooth notches during the production of the length of flexible tubing and lies on the surface of the mould core and forms a belt surface, on the finished toothed belt, which is free of elastomer material.

The construction of the moulding tool according to the invention resides in that the mould core comprises, at least at its end adjacent to the entry point of the elastomer material, a mould-core portion which projects axially over the ends of the teeth, and which forms an annular holding surface which is constricted in diameter substantially to the diameter of the tooth notches, and on which the edge (projecting axially over the ends of the teeth) of the fabric cover which can be pulled over the mould core like a sleeve, can be secured so as to rest on it with a sealing action. As a result, the effect is achieved that the elastometer material entering the mould cavity at this end of the mould core cannot flow into the tooth notches between the cover and surface of the mould core, but can only flow in along the side of the faric cover remote from the mould core and fills up the cavity situated between the fabric cover and the mould sleeve containing the reinforcing insert, and that the fabric cover is automatically pressed down into the tooth notches and bears snugly against the sides of the notches and the bottom of the notches solely by using a pressure of the elastomer material introduced. The diameter of the annular holding surface is preferably somewhat smaller than the diameter of the tooth notches measured at the bottom of the notches, so that the edge of the fabric cover can be constricted radially to below the level of the bottom of the tooth notches and be secured and, particularly with low heights of tooth notches, the axial influence of the elastomer material above the fabric cover in the tooth notches in not hindered by the securing means. A spring clamping ring which can be superimposed may be used, for example, to secure the edge of the fabric cover to the holding surface. The securing may advantageously be effected simultaneously with the reinforcing insert in that the holding surface is formed by an annular groove in which the edge of the fabric cover can be gripped by a turn of the reinforcing insert which is wound on the fabric cover about the mould core, which turn is wound into the annular groove.

The development, according to the invention, of the method of the kind referred to at the beginning resides in that, at least at one end of the mould core, the cross-sections of the tooth notches between the mould-core teeth are covered by radial contraction of the edge of the fabric cover projecting axially over the mould-core teeth and the edge of the fabric cover is secured, in a sealing manner, to a portion of the mould core without teeth and that the elastomer material is introduced into the mould cavity from the portion of the mould core containing this secured edge of the fabric cover. A stretch fabric, for example of nylon, is used for the fabric cover, so that the fabric cover to be pulled in the form of a sleeve over the mould core is expansible in the peripheral direction of the mould core. For the injection moulding of the length of flexible tubing, the method according to the invention is carried out in such a manner that after closing both ends of the mould cavity between the mould sleeve and inserted mould core, the elastomer material is injected under pressure at the end of the mould cavity at which the portion of the mould core containing the secured edge of the fabric cover lies and the fabric cover, which is expansible in the peripheral direction of the mould core, is pressed down into the tooth notches of the mould core by the injection pressure of the elastomer material and brought to bear against the cold surface of the mould core. The elastomer material which, as a result of the covering of the cross-sections of the tooth notches by the contracted edge of the fabric cover secured with a sealing action to the portion of the mould core without teeth, can only enter the mould cavity and the tooth notches at the side of the fabric cover remote from the mould core, immediately forms, on contact with the cold fabric cover, a thin skin which is fixedly connected to the fabric cover and which prevents the elastomer material from penetrating into the fabric. As a result of the injection pressure of the elastomer material, the mould cavity is quickly filled and the fabric cover is quickly pressed into the tooth notches and against the cold surface of the mould core so that the fabric cover is cooled by the mould core and so the thin skin is prevented from melting and the elastomer material from penetrating through the fabric. In order to reinforce this effect, the mould core itself is preferably additionally cooled. At the end of the mould core remote from the injection point of the elastomer material, at the temperature and viscosity of the material sufficing for the injection of the elastomer material, it is sufficient to allow the fabric cover to end with its edge flush with the end of the mould core and a cover, of the mould sleeve, cooperating in a sealing manner with the end of the mould core, to prevent elastomer material from flowing out under the edge of the fabric cover previously pressed down into the tooth notches by the elastomer material. If necessary, a projecting edge of fabric cover may also be provided at this other end of the mould core, be contracted radially inwards and secured in a sealing manner to a portion of the mould core without teeth.

With the conventional casting of the displacement principle, the elastomer material substantially only at atmospheric pressure would not press the fabric cover into the tooth notches of the mould core. In order to mould the length of flexible tubing, the method according to the invention is carried out in such a manner that the mould core with the portion of the mould core containing the secured edge of the fabric cover is first dipped into a cup-like mould sleeve and the mould cavity is filled in by the elastomer material contained, in an adequate quantity, in the mould sleeve, and that then, by piston-like pressing in of a cover, the upper open end of the mold sleeve is closed and the enclosed elastomer material is pressurized and as a result of this pressure the fabric cover, which is expansible in the peripheral direction of the mould core, is pressed down into the tooth notches of the mould core and caused to bear against the cold surface of the mould core. Because of the fluidity of the material which occurs or is necessary during the casting of elastomer materials, an axially projecting edge of the fabric cover is preferably also pulled down over the cross-sections of the tooth notches at the other end of the mould core and secured in a sealing manner to a portion of the mould core without teeth, in order to ensure that no elastomer material rising in the mould sleeve to the other end of the mould core may penetrate into the tooth notches about the edge of the fabric cover. During the casting, the elastomer material initially comes into contact with the fabric cover without pressure and at the moment of meeting the elastomer material the fabric cover is not simultaneously pressed into the tooth notches by the elastomer material and cooled by contact with the cold mould core. Preferably, therefore, during the casting of the length of flexible tubing, the fabric cover, before being used on the mould core, is impregnated at one side only with a layer made of elastomer material and laid round the mould core so that the solidified cold impregnating layer is remote from the surface of the mould core. The impregnating layer which, on the one hand, adheres firmly to the fabric and on the other hand is firmly connected to the elastomer material present in the mould sleeve, prevents the elastomer material which meets the fabric cover on penetration of the mould core into the mould sleeve from penetrating through the fabric before the fabric cover is pressed against the faces of the tooth notches of the mould core by the production of pressure during the piston-like pressing in of the cover, and the mould core may appropriately also be additionally cooled with the casting method.

The sealing securing of the edge of the fabric cover, at least at that end of the mould core at which the elastomer material enters the mould cavity during the injection or casting, can be effected in the simplest manner, within the scope of the method according to the invention, so that the reinforcing insert, during the winding round the mould core surrounded by the fabric cover, is wound with one or more turns on the portion of the mould core without teeth at the above-mentioned end of the mould core and the edge of the fabric cover is directly contracted by the reinforcing insert and bound with a sealing action on the portion of mould core without teeth. In this case, the end of the last turn of the reinforcing insert binding the edge of the fabric cover can be held in the simplest manner by pulling into a notch on the portion of the mould core without teeth. Particularly with injection moulding, a fabric cover may advantageously be used which is only expansible in the peripheral direction of the mould core and is not expansible in the axial direction of the mould core so that the fabric cover enclosed between mould core and reinforcing insert contributes to preventing an axial displacement of the turns of the reinforcing insert on the teeth of the mould core under the injection pressure of the elastomer material injected into the mould cavity.

In the drawing, two examples of embodiment of a moulding tool according to the invention are illustrated.

Figure 2:
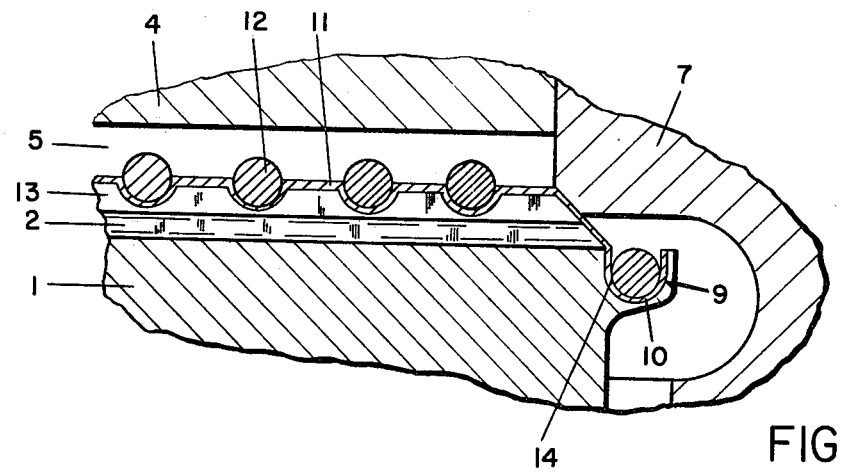
Figure 3:
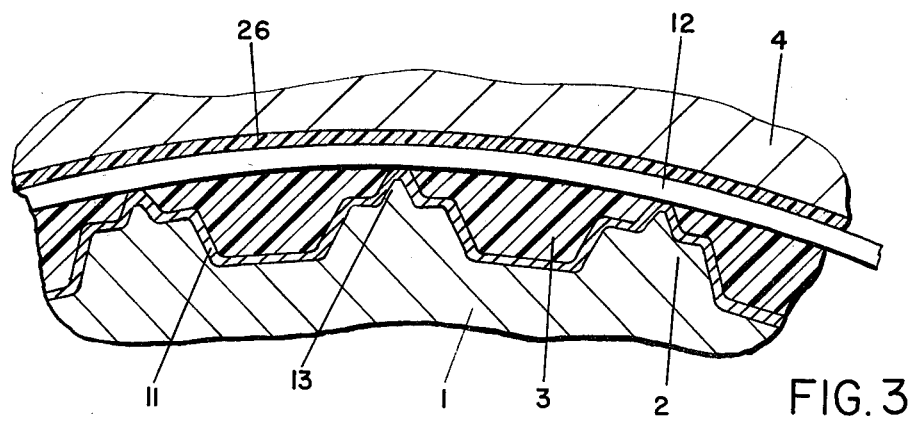
Figure 4:
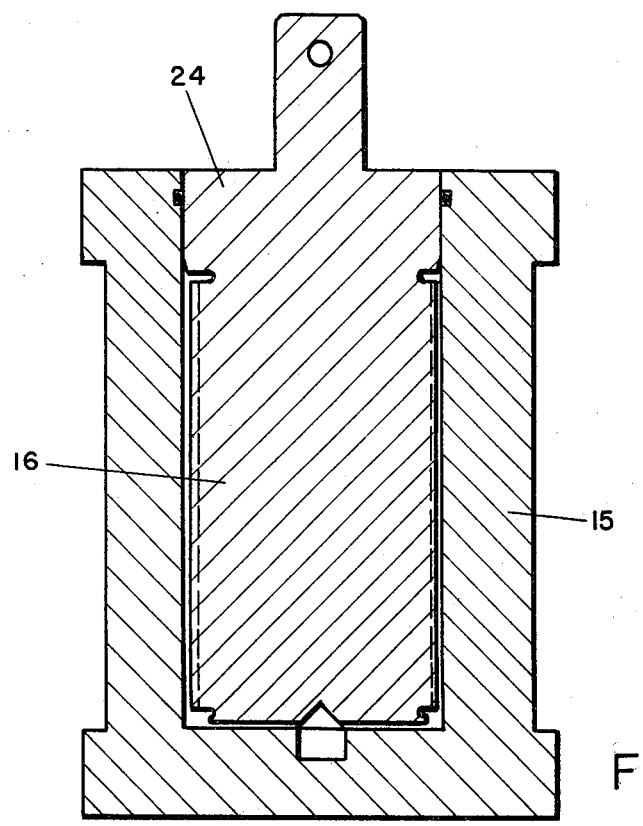
Figure 5:
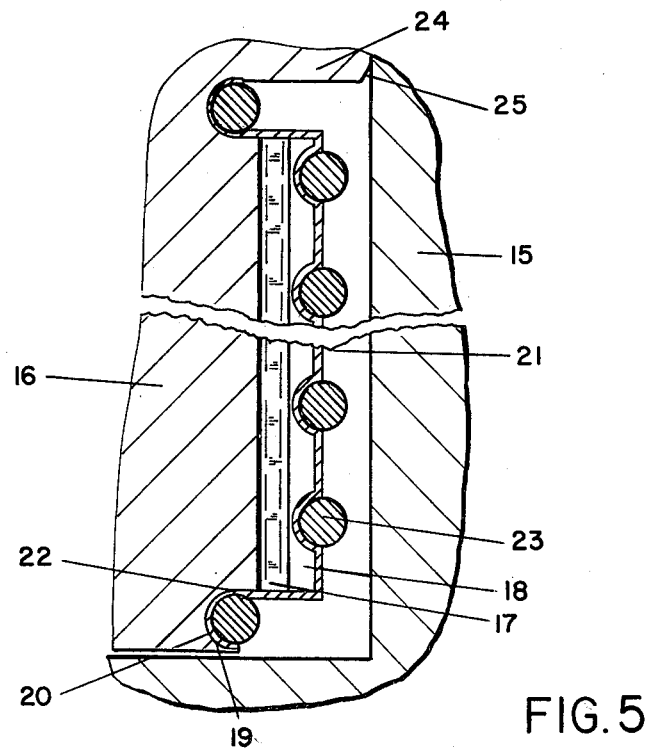

FIG. 1 shows an axial longitudinal section through the moulding tool for the injection-moulding of the length of flexible tubing, FIG. 2 shows a detail from FIG. 1 on a larger scale, FIG. 3 shows a partial cross-section on the line III---III in FIG. 1 on a larger scale, FIG. 4 shows an axial longitudinal section through the moulding tool or casting the length of flexible tubing, FIG. 5 shows a detail from FIG. 4 on a larger scale and broken away in part.

The moulding tool illustrated in FIGS. 1 to 3 consists of a cylindrical mould core 1 with teeth 2 and tooth notches 3 extending axially at its periphery and a mould sleeve 4 which surrounds the mould core 1 and which forms an annular cylindrical mould cavity 5 with the mould core 1. The mould cavity 5 is closed at both ends by covers 6 and 7 cooperating in a sealing manner with the mould sleeve 4, of which the cover 7 contains an entry point for the elastomer material constructed in the form of a channel through which the elastomer material is injected axially, under pressure, into the mould cavity 5. At the end adjacent to this entry point 8, the mould core 1 has a mould-core portion 9 which projects axially beyond the ends of the teeth 2 and which forms an annular holding surface 10, the diameter of which corresponds substantially to the diameter measured at the bottom of the tooth notches 3. The holding surface 10 may appropriately be constricted to an even smaller diameter, for example by the construction of the holding surface 10 as an annular groove as illustrated. In order to prepare for the injection-moulding of the length of flexible tubing, a fabric cover 11 in the form of a sleeve is first pulled over the mould core 1. The fabric cover 11 consists of a sleeve-shaped strip of fabric, for example of nylon, which is closed by a longitudinal welding seam and is expansible in the peripheral direction of the mould core 1 but suitably not expansible in the axial direction of the mould core 1. At first, the tooth notches 3 are hollowly spanned by the fabric cover 11. A reinforcing insert 12 in the form of wire or thread is wound helically around the mould core 1, on the fabric cover 11. Arranged on the teeth 2 are winding projections 13 which space the reinforcing insert radially from the teeth 2 by a certain distance so that the reinforcing insert lies in the so-called neutral zone of the toothed belt to be produced. The winding projections 13 are provided with depressions through which the turns of the reinforcing inset 12 laid in the depressions are held at the required distance apart and supported axially against the injection pressure of the elastomer material introduced. At the end of the mould core adjacent to the entry point 8, the fabric cover 11 projects with its edge beyond the ends of the teeth 2 and is secured by this projecting edge 14 to the holding surface 10, bearing with a sealing action against it. For this purpose, one turn of the reinforcing insert 12 is wound in the groove-shaped holding surface 10 and as a result the edge 14 of the fabric cover is tightly bound and gripped. The cross-sections of the tooth notches 3 adjacent to the entry point 8 are covered by the edge 14 of the fabric cover contracted radially inwards and tightly gripped, so that the injected elastomer material can only fill in the mould cavity over the fabric cover 11 and cannot flow under the fabric cover 11 into the tooth notches 3. At the other edge, the fabric cover 11 ends flush with the cover 6, which, with the injection method, is sufficient to prevent elastomer material from entering the tooth notches 3 around this edge of the fabric cover. During the injection of the elastomer material, the elastomer material, on contact with the cold fabric cover 11, immediately forms a thin skin which prevents elastomer material from penetrating through the fabric and at the same moment, as illustrated in FIG. 3, the fabric cover 11 is pressed down into the tooth notches 3 by the elastomer material 26 under pressure and is pressed against the cold surface of the mould core 1 which is preferably additionally cooled. As a result the skin developing on the fabric cover 11 at its side remote from the mould core 1 remains sealed and the fabric cover 11 remains free of elastomer material at its outside adjacent to the mould core 1.

The moulding tool illustrated in FIGS. 4 and 5 for casting the length of flexible tubing on the displacement principle consists of a cupshaped mould sleeve 15 which is open at the upper end and a mould core 16 which can plunge into the mould sleeve 15 and which, like the mould core of FIGS. 1 to 3, has teeth 17 extending axially with interposed tooth notches and winding projections 18 formed on the teeth 17. At the end with which the mould core 16 is first plunged into the mould sleeve 15, the mould core has a mould-core portion 19, which projects axially over the ends of the teeth 17, with a holding surface 20 constructed in the form of an annular groove. As in FIGS. 1 to 3, the fabric cover 21 pulled like a sleeve over the mould core 16 projects axially over the ends of the teeth 17 and the projecting edge 22 of the fabric cover resting with a sealing action against the holding surface 20 is bound and secured by a turn of the reinforcing insert 23 wound in the groove-shaped holding surface 20. During the plunging of the mould core into the elastomer material contained in the mould sleeve, elastomer material cannot flow under the fabric cover 21 into the tooth notches. At the other end, the mould core 16 has a piston-like cover 24 which, when the mould core 16 is inserted in the mould sleeve 15, closes its upper open end. In the course of this, the cover 24 can allow any excess amount of elastomer material to escape from the mould sleeve at its conical portion 25 engaging initially in the mould sleeve 15. On being pressed further in, the cover 24 seals off the mould sleeve 15 and the enclosed elastomer material is pressurized. As a result of this pressure, the fabric cover 21 is pressed by the elastomer material into the tooth notches of the mould core 16 and is pressed against the cold surface of the mould core, which is preferably additionally cooled as illustrated in FIG. 3. During the casting, a fabric cover is preferably used which has previously been provided at one side with an impregnating layer made of the elastomer material which forms a skin and is then laid round the mould core with the impregnating layer remote from the surface of the mould core 16, that is to say adjacent to the mould sleeve 15. This impregnating layer is sufficient to prevent elastomer material from penetrating through the fabric before the fabric cover 21 is pressed into the tooth notches by means of the elastomer material pressurized by the cover 24 and is pressed against the cold surface of the mould core 16. Preferably, as illustrated, the fabric cover 21 is also contracted radially inwards at the upper end of the mould core as at the lower end of the mould core, over the cross-sections of the tooth notches and secured with a sealing action to a portion of the mould core without teeth in order to prevent elastomer material from flowing under the fabric cover 21 into the tooth notches of the mould core 16 at the upper end of the mould core during the casting which takes place differently from the injection-moulding.

I claim:

1. A method for the manufacture of a length of flexible tubing by injection moulding, comprising the steps of
   selecting a mould core wherein the surface of the mould core is cold, the core having teeth and notches therebetween with an annular holding surface at an end of the core with a diameter substantially that of the core at the notches,
   placing a peripherably stretchable fabric cover on the mould core,
   winding said reinforcing insert on the fabric cover,
   covering at least at said one end of the mould core the cross sections of the tooth notches between the teeth by radially contracting said edge of the fabric cover which projects axially beyond said ends of said teeth,
   attaching the edge of the fabric cover sealingly to said holding surface, the latter constituting a non-toothed part of the mould core,
   inserting the mould core with the cover and reinforcing insert into a mould sleeve,
   closing the ends of a mould cavity formed between the mould core and the mould sleeve,
   injecting the elastomer material under pressure at said one end of the mould cavity where said mould core portion which contains the attached said edge of the fabric cover is located, whereby the fabric cover, which is stretchable in the peripheral direction of the mould core, is pressed down into the tooth notches of the mould core by the injection pressure of the elastomer material and brought against the cold surface of the mould core.

2. A method for producing a length of flexible tubing in the form of a toothed belt comprising the steps of
   selecting a mould comprising a core having teeth and notches therebetween with an annular holding surface at an end of the core with a diameter substantially that of the core at the notches, and a sleeve adapted to surround the core, wherein the sleeve has a pot-shape with an open upper end, with the surface of the mould core being cold,
   partially filling said pot-shaped mould sleeve with said elastomer material,
   placing a peripherably stretchable fabric cover on the mould core,
   winding a reinforcing insert on the fabric cover,
   covering at least at said one end of the mould core the cross sections of the tooth notches between the teeth by radially contracting said edge of the fabric cover,
   attaching the edge of the fabric cover sealingly to said holding surface, the latter constituting a non-toothed part of the mould core,
   initially inserting the mould core with said fabric cover and said reinforcing insert starting with said mould core portion containing said edge of the fabric cover into the pot-shaped mould sleeve, the elastomer material which is contained in the mould sleeve being thereby displaced to fill the mould cavity between the mould core and the mould sleeve, finishing the insertion of said mould core into said sleeve such that thereupon with a piston-like impressing of said top cover of said mould cover into said mould sleeve the open upper end of the sleeve is closed and the elastomer material is enclosed and placed under pressure, as a result of which pressure the fabric cover which is stretchable in the peripheral direction of the mould core is pressed down in to the tooth notches of the mould core and brought against the cold surface of the mould core.

3. The method according to claim 2, further comprising the step of
   impregnating the fabric cover before it is used on the mould core only on one side with a layer of the elastomer material so as to form a solidified cold impregnation layer, and wherein said placing step provides for
   placing the fabric cover around the mould core such that the solidified cold impregnation layer faces away from the surface of the mould core.

4. In a moulding tool for producing a length of flexible tubing in the form of a toothed belt from flowable elastomer material with a wire-formed reinforcing insert extending in the peripheral direction of the flexible tubing and a fabric cover covering the toothed side of the flexible tubing, wherein the moulding tool comprises a cylindrical mould core with teeth defining tooth notches therebetween extending axially at the periphery of the mould core and a mould sleeve which surrounds the mould core spaced therefrom forming an annular substantially cylindrical mould cavity therebetween, and an entry point for the axial supply of the elastomer material into the mould cavity being formed at one end of the mould cavity, the fabric cover being deformable under pressure of said elastomer material to conform to said teeth and said notches, the improvement wherein
   the mould core comprises at least at one end thereof adjacent to the entry point for the elastomer material, a mould core portion which projects axially beyond ends of said teeth and which forms an annular holding surface, said annular holding surface has a diameter substantially the diameter of the tooth notches,
   said mould core being adapted to have said fabric cover pulled in a sleeve-like manner over the mould core with an edge of said fabric cover projecting axially beyond said ends of said teeth, said edge securably engaging with sealing action on said annular holding surface.

5. The moulding tool as set forth in claim 1, wherein said holding surface forms an annular groove, said reinforcing insert is wound around said mould core on the fabric cover and has a turn wound in said annular groove on said edge of said fabric cover,
   said edge of said fabric cover is clampable by said turn of said reinforcing insert constituting the securing of said edge on said holding surface.

* * * * *